S. A. FANNING.
Improvement in Plows.
No. 125,185. Patented April 2, 1872.

Witnesses:
E. Wolff
Francis McArdle

Inventor:
Samuel A. Fanning
Per
Attorneys.

125,185

UNITED STATES PATENT OFFICE.

SAMUEL A. FANNING, OF JACKSONVILLE, ILLINOIS.

IMPROVEMENT IN PLOWS.

Specification forming part of Letters Patent No. 125,185, dated April 2, 1872.

Specification describing a certain Improvement in Riding-Plow, invented by SAMUEL A. FANNING, of Jacksonville, in the county of Morgan and State of Illinois.

Figure 1:
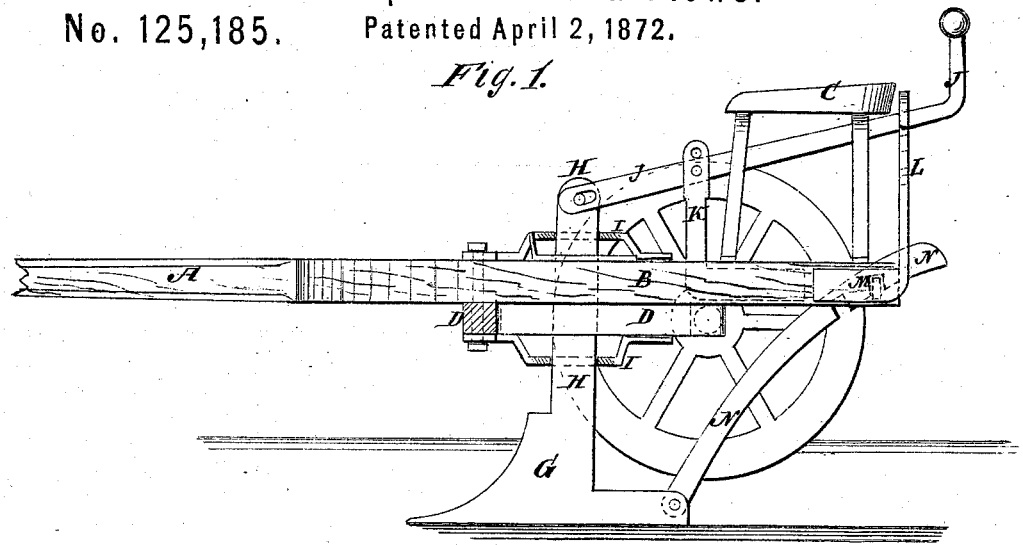
Figure 2:
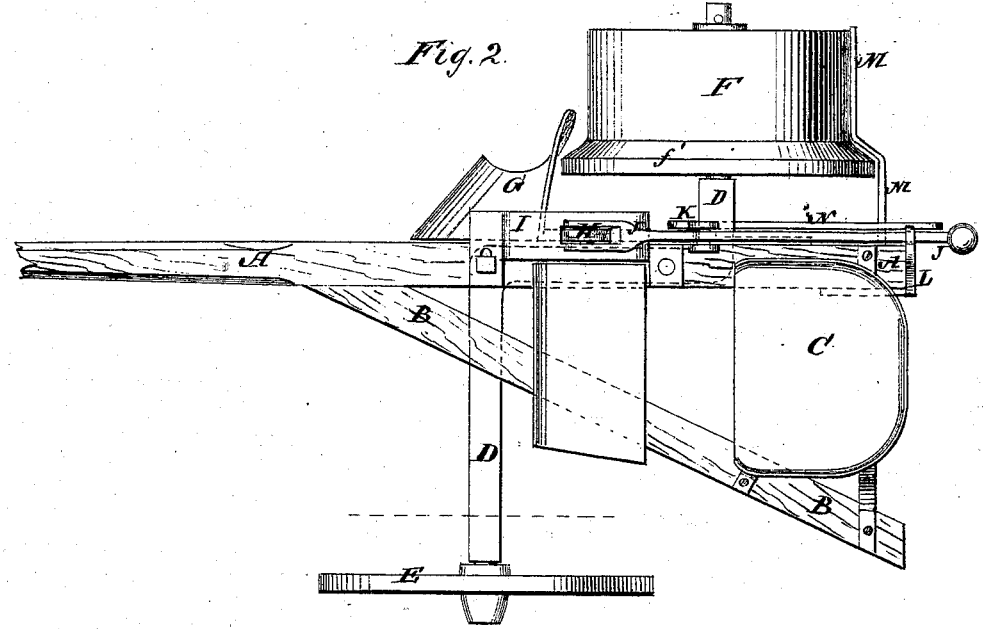

Figure 1 is a side view of my improved plow, the land-side wheel being cut off. Fig. 2 is a top view of the same.

My invention has for its object to furnish an improved riding-plow, simple in construction, convenient in use, and effective in operation; and it consists in the construction and combination of the various parts of the plow, as hereinafter more fully described.

A is the tongue, which is made long, and to which, at or near its middle part, is attached the forward end of the beam B, which inclines outward, and which serves, in connection with the rear part of the tongue A, as a frame to support the driver's seat C. The tongue A and beam B are attached to and supported by the axle D. The axle D is bent twice at right angles, and is secured to the tongue A and beam B with its middle part extending along the under side of the tongue A, and so arranged that its left-hand or land-side journal may be in front, and its right-hand or plowed-land-side journal in the rear of the plow. Upon the left-hand journal of the axle D is placed the land-wheel E, and upon its right-hand journal is placed a roller, F. The roller F is made with a flange, $f'$, upon its inner end, as shown in Fig. 2. The roller F follows just in the rear of the plow, so as to press down to its place and pulverize the furrow as it is turned by the plow. In case the ground is wet or otherwise not suitable to be rolled, the roller F may be replaced with an ordinary wheel. G is the plow, which is an ordinary turn-plow, and is attached to or formed upon the standard H in the ordinary manner. The standard H passes up through and fits into holes or slots in the keepers or plates I, which are bolted to the upper side of the tongue A and the lower side of the longitudinal or middle part of the axle D. The rear ends of the plates I are secured by a bolt that passes through them and through the tongue A and axle D. The forward ends of the plates I are secured by a bolt that passes through the tongue A and axle D, and through transverse slots in the said plates I, so that, by loosening the said bolts, the plow may be set toward or from the land, as may be desired. To the upper end of the standard H is pivoted the forward end of the lever J, which is pivoted to a standard, K, attached to the tongue A, several holes being formed in said standard K, to receive the pivoting-pin, so that the lever may be adjusted as required. The lever J extends back along the side of a toothed bar, L, the lower end of which is securely attached to the rear end of the tongue A, so that the said lever J may catch upon the said teeth and be held securely in any place into which it may be adjusted. The rear end of the lever J is bent upward, so that it may be conveniently reached and operated by the driver from his seat. By this construction, by operating the lever J the plow G may be raised from the ground for convenience in removing from place to place, or may be adjusted to run at any desired depth in the ground. To the rear end of the tongue A is attached the shank of the scraper M, which projects into such a position, and is so formed as to scrape off any soil that may adhere to the roller F. To the rear end of the land-side or foot of the plow G is pivoted the forward end of the bar N, the lower side of which has several notches formed in it to fit upon the shank of the scraper M or other support attached to the tongue A, as shown in Fig. 1, to give firmness and steadiness to the plow, and aid it in assisting side draft.

Having thus described my invention, I claim as new and desire to secure by Letters Patent—

1. The roller F, arranged as described, in the rear and to one side of the turn-plow G, so as to pulverize the furrow-slice as soon as turned over.

2. The bar N, pivoted to the heel of plow G, and notched so as to fasten over a bar on the rear of the plow-frame, as and for the purpose described.

S. A. FANNING.

Witnesses:
   MORGAN SPRINGER,
   J. T. SPRINGER.